United States Patent [19]

Hammond

[11] 3,729,023
[45] Apr. 24, 1973

[54] COUPLING ASSEMBLY

[75] Inventor: Harry H. Hammond, Middleburg Heights, Ohio

[73] Assignee: The Hansen Manufacturing Company, Cleveland, Ohio

[22] Filed: Jan. 26, 1972

[21] Appl. No.: 220,774

[52] U.S. Cl...........................137/614.03, 251/149.6
[51] Int. Cl................................................F16l 29/00
[58] Field of Search...................137/614.03, 614.04, 137/614.16, 614.18, 459; 251/149, 149.1, 149.6, 149.8, 149.9

[56] References Cited

UNITED STATES PATENTS

| 1,913,982 | 6/1933 | Fox | 251/149.6 |
| 3,073,342 | 1/1963 | Magorien | 137/614.03 |
| 3,117,592 | 1/1964 | Abbey et al. | 137/614.03 |
| 3,592,439 | 7/1971 | Ritchie | 251/149.6 |

Primary Examiner—Samuel Scott
Assistant Examiner—Ira S. Lazarus
Attorney—J. Herman Yount, Jr. et al.

[57] ABSTRACT

An improved coupling includes a shut-off and velocity control valve assembly which blocks fluid flow upon disconnection of the coupling and whenever the velocity of fluid flow through the coupling exceeds a predetermined rate. The shut-off and velocity control valve assembly includes a main valve which is operated from an open condition to a closed condition in response to a predetermined pressure differential across the main valve. Therefore, the main valve closes when the coupling is disconnected and one side of the main valve is exposed to atmospheric pressure. The main valve also closes if an excessive amount of fluid is exhausted due to a rupturing of a conduit or a malfunction of equipment associated with the coupling. A pilot valve effects operation of the main valve to the open condition upon connection of the coupling by enabling fluid to flow from a high pressure side to a low pressure side of the main valve to thereby reduce the pressure differential across the main valve. Full flow is re-established through the main valve upon opening of the main valve by a biasing spring after the pressure differential across the main valve has been reduced.

14 Claims, 6 Drawing Figures

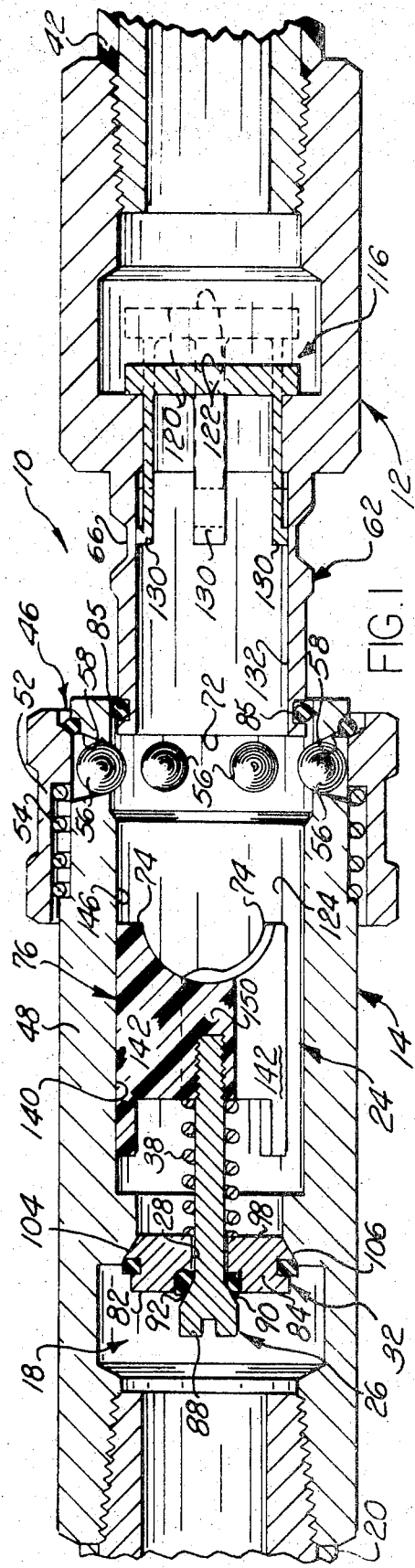

COUPLING ASSEMBLY

This invention relates generally to a new and improved coupling assembly and more particularly to a coupling assembly having a shut-off and velocity control valve assembly.

During the operation of equipment which is activated by air under pressure, the equipment may malfunction in such a manner as to exhaust a relatively large amount of air to the atmosphere. The rupturing of an air hose may also result in the wasteful exhausting of large quantities of air to the atmosphere. In addition, air may be wasted upon disconnection of a coupling assembly if a shut-off valve is not provided in the coupling assembly. Of course, whenever air is wastefully exhausted to the atmosphere, the operating load applied to an associated compressor is increased with a resulting increase in operational costs.

Accordingly, it is an object of this invention to provide a new and improved coupling assembly having a combined shut-off and velocity control valve assembly for automatically blocking fluid flow upon disconnection of the coupling assembly or upon the occurrance of any malfunction which could result in the flow of excessive quantities of air or other fluid.

Another object of this invention is to provide a new and improved coupling assembly which includes a valve which is automatically closed upon a breaking or failing of an associated conduit to prevent whip-like movement of the conduit.

Another object of this invention is to provide a new and improved coupling assembly which is readily connected due to the use of a shut-off valve that does not have to be opened during coupling.

Still another object of this invention is to provide a new and improved coupling assembly having a shut-off valve which is automatically opened after coupling without additional manipulation.

Another object of this invention is to provide a new and improved coupling assembly having plug and socket elements which can be connected to conduct fluid from one conduit to another and wherein a valve assembly blocks fluid flow upon disconnection of the plug and socket element, enables fluid to flow in response to connection of the plug and socket elements, and blocks fluid flow from the one conduit to the other in response to a predetermined velocity of fluid flow through the valve assembly when the plug and socket are connected.

Another object of this invention is to provide a new and improved coupling element having a main valve assembly which is operable from an open condition to a closed condition in response to a predetermined pressure differential across the main valve assembly, a passage for enabling fluid to flow between opposite sides of the main valve assembly to tend to reduce a fluid pressure differential across the main valve assembly when it is in the closed condition, a pilot valve which is operable from a closed condition blocking fluid flow through the passage to an open condition enabling fluid to flow through this passage, and an actuator for operating the pilot valve from the closed condition to the open condition.

Another object of this invention is to provide a new and improved coupling element as set forth in the next preceeding object and wherein the actuator operates the pilot valve to the open condition in response to connection of the coupling element with another coupling element.

These and other objects and features of the present invention will become more apparent upon a consideration of the following description taken in connection with the accompanying drawings wherein:

FIG. 1 is a sectional view of a coupling assembly constructed in accordance with the present invention, the coupling assembly being shown in a disconnected condition in which a shut-off and velocity control valve assembly is closed to block fluid flow;

FIG. 2 is a fragmentary sectional view of the shut-off and velocity control valve assembly immediately after operation of the coupling assembly to the connected condition, a pilot valve being shown in an open condition to effect a reduction in a pressure differential across a closed main valve;

FIG. 3 is a fragmentary sectional view generally similar to FIG. 2, illustrating the main valve in an open condition;

FIG. 4 is an enlarged fragmentary view illustrating a passage through which fluid flows to decrease the pressure differential across the main valve upon operation of the pilot valve to the open condition of FIG. 2;

FIG. 5 is a fragmentary pictorial illustration of an actuator for operating the pilot valve from the closed condition of FIG. 1 to the open condition of FIG. 2.

Figure 6:
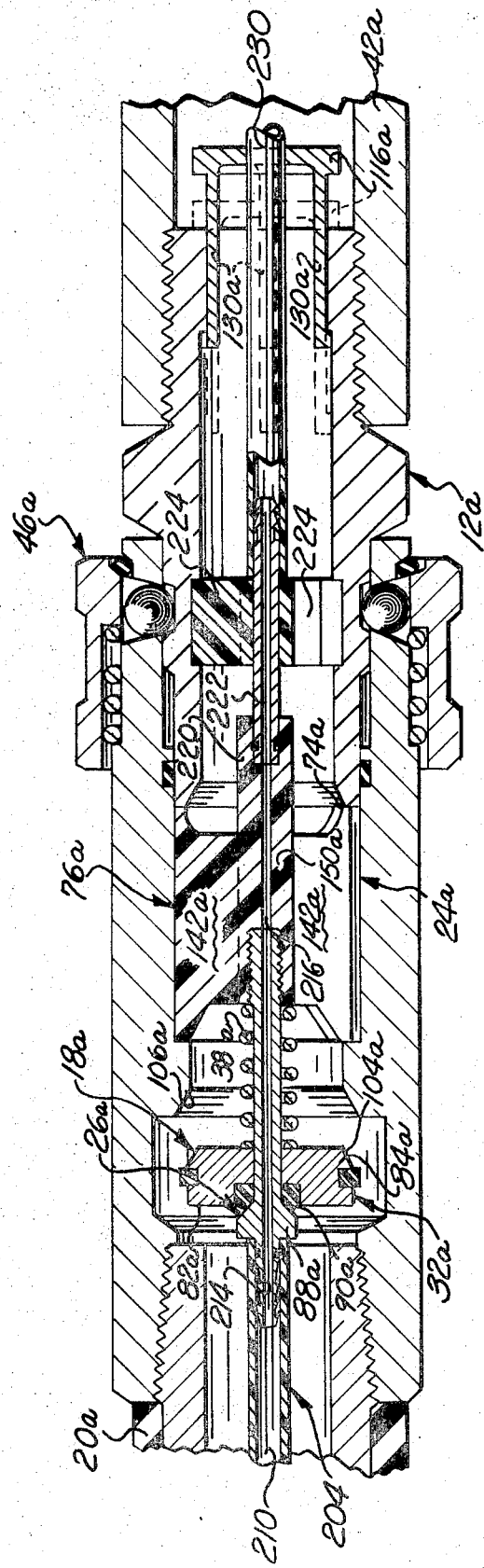
FIG. 6 is a sectional view of an embodiment of the invention which includes a conduit for conducting a second fluid such as a lubricating fluid through the coupling assembly.

A coupling assembly 10 constructed in accordance with the present invention is shown in FIG. 1 with a plug 12 disconnected from a socket 14. A shut-off and velocity control valve assembly 18 is closed to block a flow of air from a high pressure air conduit or line 20. The shut-off and velocity control valve assembly 18 is automatically opened upon interconnection of the plug 12 and socket 14. However, if the equipment associated with the coupling 10 should malfunction in a manner which could result in the excessive flow of air through the coupling or in the exhausting of large quantities of air to the atmosphere, the shut-off and velocity control valve assembly 18 will automatically close to block the flow of air through the coupling assembly 10.

Upon insertion of the plug 12 into the socket 14, the shut-off and velocity control valve assembly 18 is automatically opened. To this end, insertion of the plug 12 into the socket 14 operates an actuator 24 to actuate a pilot valve assembly 26 from the closed condition of FIG. 1 to the open condition of FIG. 2. Opening of the pilot valve assembly 26 enables air under pressure to flow through a passage 28 from a high pressure side of a main valve assembly 32 to the low pressure side of the main valve assembly. When the pressure differential across the main valve assembly 32 has been sufficiently reduced by this flow of air through the passage 28, the main valve assembly 32 is operated from the closed position of FIG. 2 to the open position of FIG. 3 under the combined influence of air pressure and a biasing spring 38.

The shut-off and velocity control valve assembly 18 automatically closes if the velocity of air flow through the coupling 10 becomes excessive. This excessively high velocity flow of air through the coupling 10 may be induced due to either an equipment malfunction or a rupturing of a downstream air hose or line 42 (FIG. 1). If this occurs, the resulting pressure differential across the main valve assembly 32 causes it to move from the open position of FIG. 3 to the closed position of FIG. 2 against the influence of the biasing spring 38 to thereby prevent the wasteful exhausting of air to the atmosphere. Since the pilot valve assembly 26 is open when the main valve assembly 32 is in the closed position of FIG. 2, the main valve assembly will be automatically opened the same as on initial connection when the equipment malfunction has been corrected.

To operate the coupling assembly 10 from the disconnected condition of FIG. 1 to the connected condition, it is necessary to first release a latch assembly 46 disposed on a body 48 of the socket 14 by pulling back a latch sleeve 52 against the influence of a biasing spring 54. When the latch sleeve 52 is pulled back, retaining balls 56 are free to move outwardly in tapered sockets or holes 58 as a nose portion 62 of the plug 12 is inserted into the socket 14. Once the plug 12 has been fully inserted into the socket, the biasing spring 54 forces the latch sleeve 52 forwardly to hold the retaining balls 56 into a locking groove 66 to thereby lock the plug 12 in the socket 14. Since the general mode of operation of the latch assembly 46 is well known to those skilled in the art, it will not be further described herein.

As the plug 12 is inserted into the socket 14, the actuator 24 initiates operation of the shut-off and velocity control valve assembly 18 to the open condition to enable air to flow under pressure from the high pressure line or conduit 20 to the low pressure line 42. Accordingly as the nose portion 62 of the plug 12 enters the socket 14, a leading end surface 72 of the nose portion engages actuator surfaces 74 on the downstream end portion of an actuator slide member or spider 76 (FIG. 2). Continued movement of the nose portion 62 of the plug 12 into the socket 14 moves the spider 76 from the inactive position of FIG. 1 to the actuated position of FIG. 2 to thereby open the pilot valve assembly 26 against the influence of the biasing spring 38. It should be noted that high pressure air acting on a upstream surface 82 of a main valve member 84 retains the main valve assembly 32 in the closed position against the influence of the biasing spring 38. An elastomeric seal ring 85 on the nose portion 62 sealingly engages the inner wall of the socket 14 when the coupling is connected.

OPening the pilot valve assembly 26 enables air to flow through the central passage 28 from the high pressure side to the low pressure side of the main valve element 84 to thereby reduce the pressure differential across the main valve element so that it can be opened by the biasing spring 38. Thus, the pilot valve assembly 26 includes an elongated valve member 88 having an annular valve face 90 which is disposed in sealing engagement with a pilot valve seat 92 to block fluid flow through the passage 28 when the pilot valve assembly is in the closed condition of FIG. 1. Operation of the pilot valve assembly 26 to the open condition of FIG. 2 moves the annular valve face 90 away from the valve seat 92 so that air can flow through the passage 28. This flow of air increases the pressure to which a downstream face surface 98 of the main valve member 84 is exposed. As the fluid pressure against the face surface 98 increases, the pressure differential across the main valve element 84 decreases until the main valve element 84 is moved from the closed position of FIG. 2 to the open position of FIG. 3 by the biasing spring 38.

When the main valve element 84 is in the open position of FIG. 3, air can flow from the conduit 20 through the socket 14 and plug 12 into the conduit 42 leading to a device which is activated by air under pressure. Under certain operating conditions this device may malfunction and exhaust excessive amounts of air to the atmosphere. In addition to a malfunction of a device connected with the conduit 42, it is possible that the conduit may be ruptured or be excessively worn so that a relatively large flow of air is exhausted from the conduit to the atmosphere. If this exhausting of air to the atmosphere is allowed to continue, a relatively heavy operating demand will be put on the compressor which supplies the inlet line 20 with air under pressure. Of course, this will substantially increase the cost of operating the air activated device which is connected with the conduit 42.

To prevent the wasteful exhausting of excessive quantities of air to the atmosphere, the main valve assembly 32 is closed whenever the velocity of the air flowing through the coupling 10 exceeds a predetermined normal operating velocity. The main valve assembly 32 is automatically closed in response to a predetermined velocity of air flow through the coupling 10 under the influence of a pressure differential which is induced across the main valve element 84. Thus, when the main valve element 84 is in the open position of FIG. 3, the space between an annular face surface 104 on the main valve member 84 and a main valve seat 106 is such that a pressure differential will result across the valve member 84 if the velocity of the fluid flowing through the coupling 10 exceeds a predetermined normal operating velocity. As the pressure differential across the main valve member 84 increases, the pressure on the face surface 82 will exceed the pressure on the face surface 98 by an amount sufficient to cause the main valve member to move from the open position of FIG. 3 to the closed position of FIG. 2 against the influence of the biasing spring 38. Of course, when the main valve member 84 is in the closed position of FIG. 2, fluid flow to the defective line 42 or the associated air activated device is substantially blocked to thereby minimize the amount of air which is wastefully exhausted to the atmosphere.

Since the air activated device associated with the conduit 42 ceases to operate when the valve 84 is closed due to a pressure differential induced by a defect in either the line 42 or the air operated device, an operator of the device is instantly alerted to the presence of the defect. Once the operator has corrected the defect, the main valve 32 is automatically opened to provide for continued operation of the air activated device. Thus, when the defect in either the hose 42 or air activated device has been corrected, the flow of air through the open pilot valve 26 and passage 28 gradually increases the fluid pressure on a downstream side of the main valve element 84. When the pressure differential across the main valve element 84 has been reduced by this flow of air through the pilot valve 26, the biasing spring 38 again moves the main valve element 84 from the closed position of FIG. 2 to the open position of FIG. 3 to enable operation of the air activated device to be continued.

Upon operation of the coupling assembly 10 from the connected condition to the disconnected condition, the shut-off and velocity control valve assembly 18 automatically blocks fluid flow through the line 20. Thus, when the latch assembly 46 is released by pulling back the sleeve 52 and the plug 12 is partially withdrawn from the socket 14, the downstream surface 98 on the main valve element 84 is exposed to atmospheric pressure. This results in a relatively large pressure differential across the main valve element 84. Therefore, the main valve element 84 is moved from the open position of FIG. 3 to the closed position of FIG. 1 as the plug 12 is disconnected from the socket 14. It should be noted that as the plug 12 is withdrawn from the socket 14, the biasing spring 38 causes the actuator spider 76 to move axially outwardly to thereby operate the pilot valve 26 to the closed condition to block fluid flow through the passage 28.

As the plug 12 is withdrawn from the socket 14, a flow of air from the conduit 42 to the atmosphere could cause the end of the conduit 42 to whip or move transversely under the influence of air flow induced forces. To prevent this whipping action, a check valve 116 is provided in the plug element 12. When the coupling 10 is connected, fluid pressure against a upstream face surface 120 of the check valve 116 causes it to move to the open position shown in dashed lines in FIG. 1. However, as soon as the plug 12 is withdrawn from the socket 14, the downstream surface 120 is exposed to atmospheric pressure and air pressure against an upstream surface 122 causes the check valve 116 to move to the closed position shown in solid lines in FIG. 1. Of course, closing the check valve 116 blocks fluid flow from the conduit 42. A leakage passage is provided in the check valve 116 to enable the fluid pressure in the conduit 42 to be gradually reduced while the coupling 10 remains disconnected.

The shut-off and velocity control valve assembly 18 is relatively compact due to the fact that the pilot valve assembly 26, main valve assembly 32 and actuator 24 are disposed in the valve chamber 124 in a coaxial relationship with each other and with the socket 14. Thus, the circular main valve member 84 is disposed with its central axis coincident with the longitudinal axis of the generally cylindrical socket 14. The passage 28 is formed by a cylindrical opening extending through the center of the main valve member 84 so that the pilot valve seat 92 and valve member 88 are disposed in a coaxial relationship with both the main valve member 84 and the valve chamber 124. Finally, the actuator member 76 has guide surfaces 140 formed on radially projecting legs 142 to engage the cylindrical side wall 146 of the valve chamber 214 (see FIG. 1) to position a central body portion 150 of the actuator member in the center of the valve chamber 124.

In accordance with known practices, it is contemplated that under certain operating conditions it will be desirable to conduct a second fluid such as a lubricating fluid through the coupling assembly to an air actuated device or to other two fluid applications. Accordingly, in the embodiment of the invention illustrated in FIG. 6 a coupling assembly 200 is provided with a conduit arrangement 204 for conducting the second fluid through the coupling assembly to an air actuated device. Since the coupling assembly 200 is generally similar in construction to the coupling assembly 10, the various parts of the coupling assembly 200 are designated with numerals which are the same as the numerals utilized to designate the components of the coupling assembly 10, the suffix letter "a" being utilized in connection with the numerals of FIG. 6 to avoid confusion.

The second fluid conduit 204 extends longitudinally through the center of plug element 12a and socket 14a. The second fluid conduit 204 includes a flexible tube 210 of plastic or other suitable material, which conducts the second fluid from a source to a passage 214 extending axially through the center of the pilot valve member 88a. The passage 214 is aligned with a passage 216 through a central portion 150a of the actuator slide 76a. The actuator slide 76a is provided with a socket end portion 220 which receives a conduit member 222 upon operation of the coupling 200 to the connected condition shown in FIG. 6. The conduit member 222 is supported in the center of the plug 12a by a support spider 224 having the same general configuration as the actuator spider 76 of FIG. 5. The tube 222 is connected in fluid communication with a flexible tube 230 which extends through a check valve 116a to the air actuated device.

Upon initial operation of the air actuated device a second fluid, such as lubricant under pressure is forced through the conduit assembly 204. If this second fluid is used as a lubricant it will promote smooth operation of the device. It should be noted that the flexible tubing 210 is of sufficient length to enable the shut-off and velocity control valve assembly 18a to be operated to the closed position as the coupling 200 is disconnected.

In view of the foregoing description, it can be seen that the coupling assembly 10 includes a shut-off and velocity control valve assembly 18 which automatically blocks fluid flow upon disconnection of the coupling assembly. In addition, the shut-off and velocity control valve assembly 18 is effective to block fluid flow through the coupling assembly 10 in the event of a malfunction which could result in the exhausting of extensive quantities of air or other fluid into the atmosphere. The shut-off and velocity control valve assembly 18 includes a main valve assembly 32 which is operated from an open condition to a closed condition in response to a predetermined pressure differential across the main valve assembly. Therefore, the main valve assembly 32 closes when the coupling 10 is disconnected and one side of the main valve assembly is exposed to atmospheric pressure. In addition, the main valve assembly 32 also closes if an excessive amount of fluid is exhausted to the atmosphere due to a rupturing of a conduit or malfunction of equipment associated with the coupling. The pilot valve assembly 26 effects operation of the main valve assembly 32 to the open condition upon connection of the coupling by enabling fluid to flow from the high pressure side of a main valve element 32 through a central passage 28 to a low pressure side of the main valve element to thereby reduce the pressure differential across the main valve assembly 32.

Although the shut-off and velocity control valve assembly 18 has been illustrated as being disposed in the socket 14, it is contemplated that the shut-off and velocity control valve assembly could be disposed in the plug 12 if the conduit 42 was connected with a source of air under pressure and a conduit 20 connected with an air activated device. It should also be understood that although the coupling assembly 10 has been described with air as being the operating fluid conducted through the coupling assembly, it is contemplated that the coupling assembly could be used with other operating fluids.

Having described specific preferred embodiments of the invention, the following is claimed:

1. A coupling element for use in a coupling assembly which is operable between a connected condition and a disconnected condition, said coupling element comprising a body, first valve means disposed in said body and operable from an open condition to a closed condition in response to a predetermined pressure differential across said first valve means, passage means for enabling fluid to flow between opposite sides of said first valve means to tend to reduce the fluid pressure differential across said first valve means when said first valve means is in the closed condition, second valve means disposed in said body and operable between a closed condition blocking fluid flow through said passage means and an open condition enabling fluid to flow through said passage means, and actuator means for operating said second valve means from the closed condition to the open condition.

2. A coupling element as set forth in claim 1 wherein said actuator means includes means for operating said second valve means from the closed condition to the open condition in response to operation of the coupling assembly from the disconnected condition to the connected condition.

3. A coupling element as set forth in claim 1 further including conduit means extending through said first and second valve means for conducting a second fluid to a fluid activated device connected in fluid communication with said coupling element.

4. A coupling element as set forth in claim 1 further including spring means for applying a biasing force to said first valve means urging said first valve means from the closed condition toward the open condition upon opening of said second valve means.

5. A coupling element as set forth in claim 4 wherein said body includes means defining a chamber having a longitudinally extending central axis, said first and second valve means, actuator means and spring means being disposed in said chamber in a coaxial relationship with its central axis.

6. A coupling element as set forth in claim 1 wherein said first valve means includes a main valve seat and a main valve member movable between a closed position disposed in sealing engagement with said main valve seat and an open position spaced from said main valve seat, said main valve member having an upstream surface exposable to a fluid pressure force tending to urge said main valve member against said main valve seat when said main valve member is in the closed position, said main valve member having a downstream surface which is exposable to a fluid pressure force tending to urge said main valve member away from said main valve seat, said passage means extending through said main valve member between said upstream and downstream surfaces, said second valve means including a pilot valve seat formed on said main valve member adjacent to said upstream surface at one end of said passage means and a pilot valve member extending through said passage means and having a face surface which is movable between a closed position disposed in abutting engagement with said pilot valve seat and an open position spaced from said pilot valve seat, said actuator means including a slide member disposed downstream of said main valve member and connected with said pilot valve member.

7. A coupling element as set forth in claim 6 further including spring means for urging said pilot valve seat and face surface into abutting engagement and for urging said main valve member to move from the closed position to the open position upon movement of said pilot valve member to the open position.

8. A coupling element as set forth in claim 7 wherein said main valve member, pilot valve member, and surface means are disposed in a coaxial relationship with each other.

9. A coupling element as set forth in claim 7 wherein said body includes wall means defining a longitudinally extending chamber and said slide member includes a central portion connected to said pilot valve member and disposed along the longitudinal axis of said chamber, said slide member including guide surface means disposed in engagement with said wall means and connected with said central portion for guiding movement of said slide member relative to said wall means.

10. A coupling assembly for use in connecting a pair of conduits in fluid communication with each other, said coupling assembly comprising a plug element adapted to be connected with one of the conduits, a socket element adapted to be connected with the other conduit, said plug and socket elements being movable relative to each other between a disconnected condition in which said plug and socket elements are spaced apart and a connected condition in which said plug element is received in said socket element, and valve means for blocking fluid flow from at least one of the conduits when said plug and socket elements are in the disconnected condition, for enabling fluid to flow from the one conduit to the other conduit in response to movement of said plug and socket elements from the disconnected condition to the connected condition, and for blocking fluid flow from the one conduit to the other conduit in response to a predetermined velocity of fluid flow through said valve means when said plug and socket elements are in the connected condition.

11. A coupling assembly as set forth in claim 10 wherein said valve means includes a main valve operable from an open condition to a closed condition in response to a predetermined pressure differential across said main valve, a pilot valve operable from a closed condition to an open condition connecting opposite sides of said main valve in fluid communication with each other, and actuator means for operating said pilot valve to the open condition upon movement of said plug and socket elements to the connected condition.

12. A coupling assembly as set forth in claim 10 further including conduit means in said socket element and in said plug element for conducting a second fluid through said coupling assembly to a fluid actuated device connected with said coupling assembly.

13. A coupling assembly as set forth in claim 10 wherein said valve means includes a main valve seat, a main valve member movable relative to aid main valve seat between a closed position engaging said main valve seat and an open position spaced from said main valve seat, actuator means for effecting movement of said main valve member from the closed position to the open position in response to movement of said plug and socket elements to the connected condition, and means supporting said main valve member for movement from the open position to the closed position in response to a predetermined velocity of fluid flow through said valve means when said valve means when said plug and socket elements are in the connected condition.

14. A coupling assembly as set forth in claim 13 further including check valve means disposed downstream of said main valve member when said plug and socket elements are in the connected condition, said check valve means being operable from a closed position to an open position under the influence of fluid pressure transmitted from upstream of said main valve member to enable fluid to flow between the conduits.

* * * * *